(No Model.)
G. SIMKINS.
PRESERVE JAR FASTENING.
No. 402,358. Patented Apr. 30, 1889.
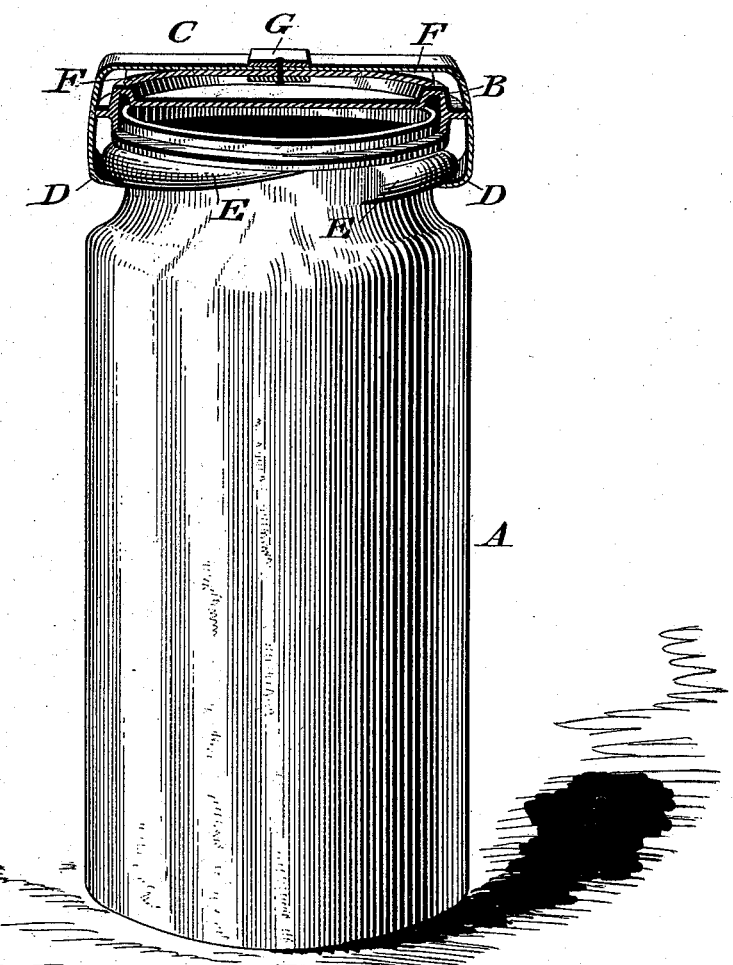
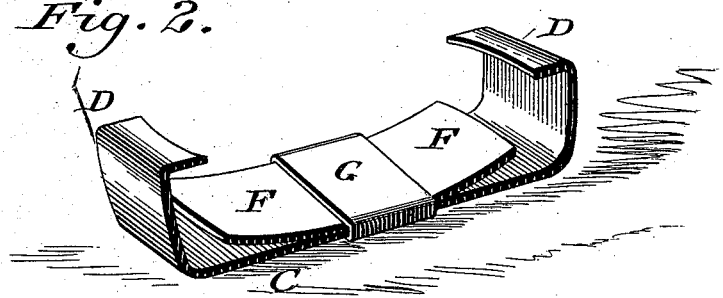
WITNESSES:
P. F. Nagle
Robt. Aiton
INVENTOR
George Simkins
BY Wiedersheim & Fairbanks
ATTORNEYS.

UNITED STATES PATENT OFFICE.

GEORGE SIMKINS, OF PHILADELPHIA, PENNSYLVANIA.

PRESERVE-JAR FASTENING.

SPECIFICATION forming part of Letters Patent No. 402,358, dated April 30, 1889.

Application filed February 23, 1889. Serial No. 300,889. (No model.)

*To all whom it may concern:*

Be it known that I, GEORGE SIMKINS, a citizen of the United States, residing in the city and county of Philadelphia, State of Pennsylvania, have invented a new and useful Improvement in Preserve-Jar Fastenings, which improvement is fully set forth in the following specification and accompanying drawings.

My invention relates to improvements in preserve-jar fastenings; and it consists in the combination of parts as herein set forth and claimed.

Figure 1 represents a perspective view, partly in vertical section, of a preserve-jar fastening embodying my invention. Fig. 2 represents a perspective view of the fastening in inverted position and on an enlarged scale.

Similar letters of reference indicate corresponding parts in the two figures.

Referring to the drawings, A designates a preserve-jar, and B the lid thereof.

C designates a bail, which is provided with lips D, for engagement with the inclines or spiral lugs E of the jar, the parts thus far described being of well-known construction. Secured to the bail and depending therefrom is a spring, F, which consists of a flat piece of suitable metal of curved form, its ends flaring and pointing downward, so as to bear against the upper face of the lid of the jar near the periphery thereof.

It will be seen that when the lid is rested on the neck of the jar the bail is placed on the lid and rotated, whereby its lips engage with the lugs E and ride under the same, so that the lid is pressed upon its seat. During this operation the spring is compressed or forced against the lid, and by its elasticity serves to prevent injurious strain of the bail upon the lugs and lid, and also takes up lost motion, so that the lid is reliably retained in closed position.

G designates a band which embraces the crowns of the spring and bail, and is soldered thereto, if desired, thus connecting said spring with the bail in a firm and inexpensive manner.

Having thus described my invention, what I claim as new, and desire to secure by Letters Patent, is—

The lid B, in combination with the bail C, having the lips D, the curved spring-piece F, having flaring ends bent downwardly and adapted to bear against the lid near the periphery thereof, and the band G, embracing both the bail C and the spring-piece, substantially as described.

GEORGE SIMKINS.

Witnesses:
JOHN A. WIEDERSHEIM,
A. P. JENNINGS.